No. 704,317. Patented July 8, 1902.
H. B. GILLIS.
BICYCLE.
(Application filed July 7, 1897.)
(No Model.)
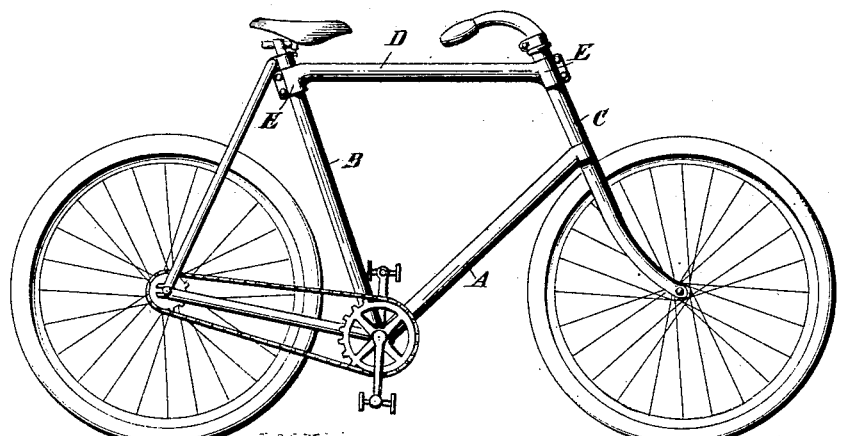
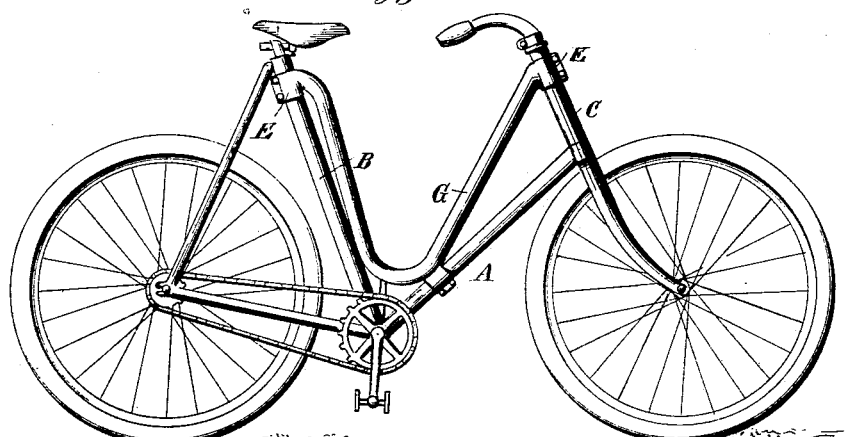
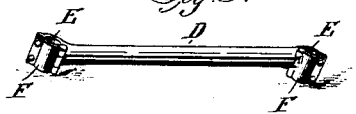
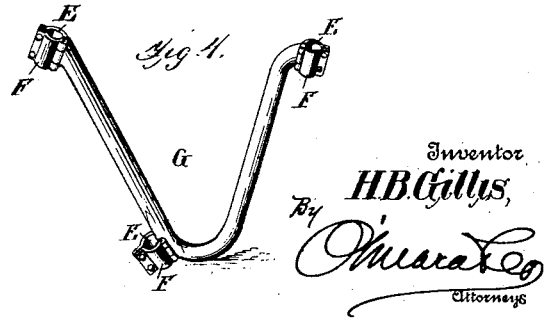
Witnesses
Inventor
H. B. Gillis,
Attorneys

UNITED STATES PATENT OFFICE.

HARRY BURDETTE GILLIS, OF MISHAWAKA, INDIANA, ASSIGNOR OF ONE-HALF TO MATHIAS LANG, OF MISHAWAKA, INDIANA.

BICYCLE.

SPECIFICATION forming part of Letters Patent No. 704,317, dated July 8, 1902.

Application filed July 7, 1897. Serial No. 643,732. (No model.)

*To all whom it may concern:*

Be it known that I, HARRY BURDETTE GILLIS, residing at Mishawaka, in the county of St. Joseph and State of Indiana, have invented a new and useful Bicycle, of which the following is a specification.

My invention relates to bicycles, and has for its object to furnish means whereby a bicycle may be converted from a man's wheel to a lady's wheel, and vice versa.

With this object in view my invention consists in providing a detachable top bar, which may be readily attached to a drop-frame or lady's bicycle to convert it into a wheel for men's use.

My invention further consists in a diamond or other bicycle frame with a detachable top bar, so that it may be converted into a lady's wheel.

My invention further consists in providing a bicycle-frame with a detachable top bar and a detachable drop-bar, whereby it may be converted into a man's or lady's wheel at will.

My invention further consists in the improved construction, arrangement, and combination of parts hereinafter fully described and afterward specifically pointed out in the claims.

In order to enable others skilled in the art to which my invention most nearly appertains to make and use the same, I will now proceed to describe its construction and operation, having reference to the accompanying drawings, forming part of this specification, in which—

Figure 1 is a side elevation of a bicycle constructed according to my invention adjusted to the form of a man's wheel. Fig. 2 is a similar view of a wheel constructed in accordance with my invention in the form of a lady's wheel. Fig. 3 is a detail perspective view of the detachable top bar, and Fig. 4 is a detail perspective view of the detachable drop-bar.

Like letters of reference mark the same parts wherever they occur in the different figures of the drawings.

Referring to the drawings by letters, A is the front brace, B the seat-post, and C the steering-post, of a bicycle-frame of any well-known or approved form.

As is well known, men's wheels are provided with a top bar which is a permanent part of the frame, and for this reason they cannot be used by ladies. In order to utilize a man's wheel for ladies' use, I have provided a frame with a detachable top bar D, which, as is usual, is constructed of the best steel tubing, preferably cold-drawn seamless steel tubing, and I provide it with a clamp at each end set at proper angles to the bar to embrace the seat-post and steering-post, said clamps consisting, respectively, of a rigid half E and a hinged half F, each half provided with registering holes to receive the securing-bolts. A lady's wheel having the ordinary drop-bar can be converted into a man's wheel by fitting it with such a detachable top bar as may be readily attached and detached when desired by the use of an ordinary wrench without the necessity of employing skilled labor.

G is my detachable drop-bar. It, like my detachable top bar D, is made of steel tubing and is provided with a clamp at each end set at proper angles to embrace the seat-post and steering-post, respectively. It is also further provided with a third clamp near its angle set at a proper angle to the bar to embrace the front brace A. These clamps, like those of the detachable top bar, each consist of a rigid half E and a hinged half F, said halves being provided with registering holes to receive the securing-bolts.

A man's wheel with a detachable top bar may be readily and easily converted into a lady's wheel by simply detaching the top bar and attaching my detachable drop-bar, the drop-bar being as easily attached and detached by the use of an ordinary wrench as is the top bar, as before described.

The advantages of a bicycle constructed in accordance with my invention will be obvious from the foregoing description. By its use the expense of separate wheels for a gentleman and lady—such, for instance, as a man and wife or brother and sister—is rendered unnecessary and a single wheel made to answer all purposes. Again, a person having bicycles for hire if provided with wheels so constructed can accommodate all customers as long as he has a single wheel left, whereas with the ordinary wheels he is many times caught with only ladies' wheels on hand when a man's wheel is wanted, or vice versa.

While I have illustrated and described the best means now known to me for carrying out my invention, I wish it to be understood that I do not restrict myself to the exact details of construction shown and described, but hold that any slight changes or variations, such as might suggest themselves to the ordinary mechanic, would clearly fall within the limit and scope of my invention.

Having thus fully described my invention, what I claim as new, and desire to secure by Letters Patent of the United States, is—

1. A detachable brace for bicycles consisting of a substantially U-shaped bar provided at one end with a clamp to engage the steering-head, at the other end with a clamp to engage the upright seat-support, and intermediate the two ends with a clamp engaging the drop portion of the bicycle, substantially as described.

2. A detachable frame-bar for bicycles provided with a clamp at each end set at the proper angle to embrace the steering-head and the seat-supporting bar of a bicycle-frame, and an additional clamp located intermediate of the ends of the bar to engage the front bar of said frame, each clamp consisting of two members curved to conform to the shape of the post or bar to be engaged, one of said members being rigid upon the bar, while the other member has a hinged connection therewith, a perforated flange upon the outer end of each member, and bolts to engage the perforations to secure the members together, substantially as described.

3. In a convertible bicycle, the combination with a removable upper frame-bar, of a detachable brace consisting of a curved bar provided at the ends with means to engage the steering-head and the seat-support and intermediate the two ends with means to engage the drop portion of the frame, substantially as described.

HARRY BURDETTE GILLIS.

Witnesses:
F. HERBERT IRWIN,
J. A. GRAHAM.